United States Patent
Safadi et al.

(10) Patent No.: US 8,442,964 B2
(45) Date of Patent: May 14, 2013

(54) INFORMATION RETRIEVAL BASED ON PARTIAL MACHINE RECOGNITION OF THE SAME

(75) Inventors: Rami B. Safadi, Vienna, VA (US); Ibrahim M. Hallaj, Waltham, MA (US)

(73) Assignee: Rami B. Safadi, Vienna, VA (US)

( * ) Notice: Subject to any disclaimer, the term of this patent is extended or adjusted under 35 U.S.C. 154(b) by 0 days.

(21) Appl. No.: 12/982,315

(22) Filed: Dec. 30, 2010

(65) Prior Publication Data

US 2011/0161305 A1 Jun. 30, 2011

Related U.S. Application Data

(60) Provisional application No. 61/284,995, filed on Dec. 30, 2009.

(51) Int. Cl.
*G06F 7/00* (2006.01)
*G06F 17/30* (2006.01)

(52) U.S. Cl.
USPC ............ 707/705; 707/758; 707/759; 707/760

(58) Field of Classification Search ....... 704/8; 707/705, 707/758, 759, 760
See application file for complete search history.

(56) References Cited

U.S. PATENT DOCUMENTS

| | | | |
|---|---|---|---|
| 2003/0200079 A1* | 10/2003 | Sakai | 704/8 |
| 2006/0041828 A1* | 2/2006 | King et al. | 715/500 |
| 2008/0319962 A1* | 12/2008 | Riezler et al. | 707/4 |

* cited by examiner

*Primary Examiner* — Vincent Boccio
(74) *Attorney, Agent, or Firm* — Intrinsic Law Corp; Ibrahim M. Hallaj

(57) ABSTRACT

A system and method for capturing and recognizing at least a portion of a source document, whether written or audible, then searching for information, or other documents, that correspond to the captured and recognized portion of the source document. Various techniques for adding translation and/or searching are also disclosed. In some instances, an iterative machine learning process is applied to improve the performance of an aspect of the system.

13 Claims, 2 Drawing Sheets

INFORMATION RETRIEVAL BASED ON PARTIAL MACHINE RECOGNITION OF THE SAME

RELATED APPLICATIONS

This application claims the benefit under 35 USC §119 of provisional application No. 61/284,995, filed on Dec. 30, 2009, bearing the present title, which is hereby incorporated by reference in its entirety.

TECHNICAL FIELD

The present disclosure generally relates to machine recognition such as optical character recognition (OCR) and automatic speech recognition (ASR) systems and more particularly to the use of machine-recognized results as a basis for search in the context of electronic or online searching systems.

BACKGROUND

Machine recognition of input to derive therefrom a recognized output is a useful and common process. Such recognition includes taking a visible input of textual characters and optically recognizing the visible characters as text, sometimes called optical character recognition, or OCR. Also, machine recognition can take the form of taking an audible input such as the spoken voice of a user and automatically determining the words and phrases spoken by the user, a process sometimes referred to as automatic speech recognition, or ASR.

Optical character recognition (OCR) systems are known and used for machine recognition of printed characters and text. Generally, an OCR system is equipped with an optical sensor that may include a camera or scanner apparatus to optically detect the printed text on a page. Also, the OCR system is adapted to take an output from its optical sensor or scanner element and feed that into a computerized recognition apparatus that determines the alphabetical or textual elements from the scanned images on the page. An output apparatus such as a printer or monitor screen provides a visual output to a user based on the results of the optical recognition process. The OCR system can also cause the scanned information and the output of the recognition step to be stored in a computer file such as a text editor file.

Automatic speech recognition (ASR) has developed into a field of art that combines knowledge of user speech patterns as well as algorithms for determining the words and phrases being spoken. ASR is sometimes related to a corresponding process for producing speech-like sounds from a machine, known as speech synthesis. Those skilled in the art may appreciate the underlying techniques of OCR, ASR and speech synthesis, and these will not be presented here in detail beyond that needed to understand the present disclosure and embodiments.

Systems and methods for machine recognition are generally prone to errors of various kinds. In the context of OCR, such errors can be the result of imperfect scanning or optical processing of a scene, e.g., printed words on a paper surface. The errors can also result from poor lighting or other conditions such as bad original printing quality or a poor or dirty or damaged print medium onto which the original text is printed. In addition, the algorithms used to recognize the scanned information can be flawed or incomplete and result in errors in the output of an OCR system. Similarly, acoustical systems for ASR and the algorithms for processing speech in a machine are imperfect and can return incorrect results. The errors from ASR systems are generally attributed to variations in speech by the speaker, imperfections in the acoustical detection or microphone or sound processing apparatus for ASR, and from flawed or resource-limited algorithms for performing the ASR process on detected sound data.

It is a known goal of machine recognition systems such as OCR and ASR systems to reduce the number or frequency or severity of the errors in these systems, yet these systems and methods remain imperfect despite recent improvements to these systems and methods. It is also a goal to provide useful automated machine search tools for searching information in a database or network and returning a result of the search to a user.

SUMMARY

Embodiments hereof include systems and methods for machine recognition of an input including for example by optical character recognition of text or by speech recognition of spoken words, and further for searching of available information for documents and works relating to the recognized text or speech input. The recognized text or speech are generally portions or segments or fragments of a larger document or work or manuscript from which the recognized portion was derived. In some embodiments, a portion of a document or work or manuscript (collectively referred to as documents for the sake of brevity) is scanned using a machine recognition system to obtain at least a partial recognized output thereof. The partial recognized output is used as an input to a search system, which can search a database of information, such as would be found on a network such as the Internet or in an electronic repository or library, in order to locate a copy of the whole document or a related copy or version or other document corresponding thereto.

In other embodiments, once the copies of the original document are returned by the search engine, these copies of the original document can be used to refine the machine-recognition results or inform the results of the machine recognition process so as to produce a more complete recognized output. Also, the results returned from the search engine can be used to perform further operations such as machine translation from one language to another, and other useful functions.

In yet other embodiments, a text-to-speech engine can be coupled to the system and used to convert the text of the original document or the text of the found documents or any portions thereof to audible synthesized speech files or output. Other stages can be applied to the present processes such as translation from one language to another before or after searching. The translation can be automated machine translation, which in some embodiments is itself used to train or iteratively refine the search engine capabilities and/or the translation and/or the OCR and ASR capabilities of the system and the algorithms used therein.

Several benefits of the present system and method may include improving the final accuracy and reliability of a machine recognition system generally in that the results of a search based on a machine recognition-derived portion of a document can be used to refine or correct the machine recognition of the document. Also, the present system and method can allow retrieval of an entire version or copy of an original document without having to optically recognize the entirety of the content of such a document. Specifically, if one page or even one paragraph of a book is optically scanned using the present system, this portion of the document may be unique enough for a search engine to then locate and retrieve the entire book without needing to recognize that entire book.

Additionally, the present system and method permit locating a complete copy of a document in the event that only portions of the document are available such as when a readable manuscript is damaged or when an audible record is damaged or partially erased with age or incoherent due to noise, interference and the like. In addition, using other auxiliary components such as translation or text mining engines or advertising engines can be used to make use of the retrieved information and documents depending on the application at hand.

BRIEF DESCRIPTION OF THE DRAWINGS

For a fuller understanding of the nature and advantages of the present invention, reference is be made to the following detailed description of preferred embodiments and in connection with the accompanying drawings, in which.

DETAILED DESCRIPTION

Figure 1:
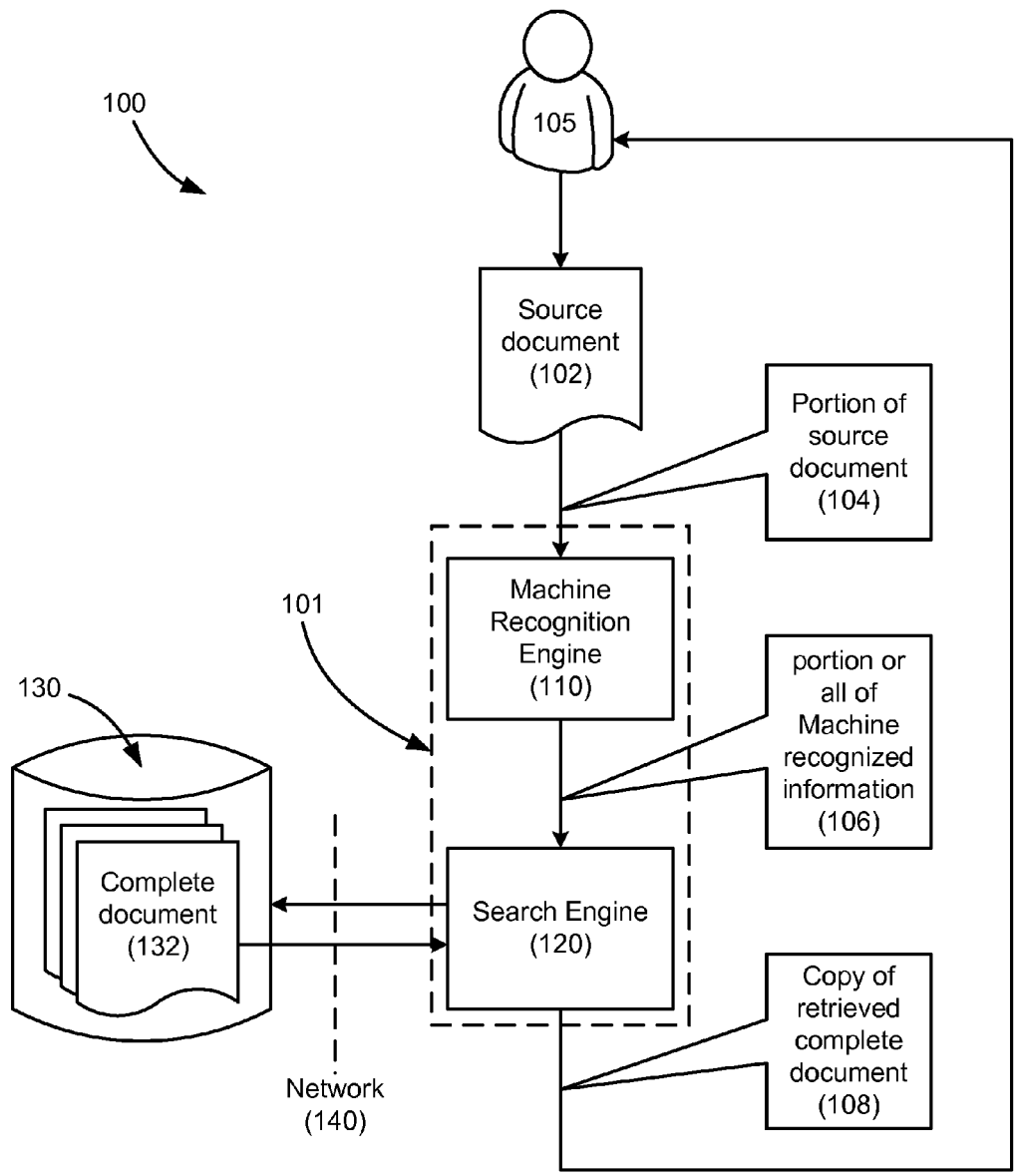
FIG. 1 illustrates an exemplary scenario for capturing, recognizing, and searching for information corresponding to a source document.

There are many reasons why finding an original or complete copy of a document (for example a readable text or audible speech document) can be useful. For example, a person may find a quote of interest and wish to see the entire source of the quote. Or a person may wish to gather and take with him or her the entire text of an article, but only has access to a limited portion of the article. Or a person may have access to one version of a printed or hand-written work and wish to confirm it or compare it to other versions of the same or a similar work. In each of these and other examples, there is a portion of a greater document or work which is available to a user and the user wishes to find the complete original document or work, or a related copy thereof. These and other needs for finding and retrieving copies of original documents or works from an available database (or online source) can also arise in the context of a portion of an original document as made available to a user from machine recognition of a portion of the original document. That is, a user may have available to him or her a machine recognition-derived portion of a larger document, and the user may wish to find or retrieve the rest of the document from which the recognition-derived portion came. The present disclosure provides various embodiments of systems and methods for accomplishing the above, and more, as would be realized by those skilled in the art upon reviewing the instant disclosure.

In some specific embodiments, a portion of text is captured, recorded, or scanned for recognition by an OCR system using an OCR process. In other embodiments, the portion of a recognized document derives from ASR of audible information. The machine recognition system in each case generates a recognized portion output as a result of said machine recognition process. The recognized portion output corresponds to at least a portion of content of an original document, which original document may be found online (e.g., on the Internet) or in some other available document database.

One can envision a situation in which a poorly printed, recorded, or damaged original document (visible or audible) would still yield some recognizable portions but not the entire document would be available or recognizable. Specifically, an application may include that where an original printed document has been burned or is missing pages or portions of pages through exposure to the elements, water damage, or other malice of man or nature. Any long or short work may be the subject of the present systems and methods, including road signs, writings on residential or commercial ways and buildings, doors, advertising content and so on. Other examples for which the present systems and methods can be useful include where portions of audible files are missing due to partial erasure of a recorded speech through neglect or age so that only some of the words are recognizable. Even situations where the document is too dim, weak, faded, distant, or otherwise too poor to completely recognize more than portions thereof can benefit from the present systems and methods. In these instances it may not be possible to machine recognize the entire printed or spoken manuscript even if a user did try to do so. Nonetheless, the recognized portion output of the machine recognition process may still be used as an input to a search engine coupled to a database, network, or the Internet to find the corresponding full document or a copy or version thereof. The search engine can locate articles from the Internet or the document database, which include information related to the recognized input entered into the search engine.

The resulting search results may include returned result containing several or many instances of copies of the original document of which the recognized portion was derived. These copies of the original document are of value to the user conducting the search and are returned to the user. It will be seen below that other optimizations can be performed on the machine-recognized portions so as to improve the likelihood of the search engine finding the original or copy of the desired document.

We now to FIG. 1 which illustrates a general scenario 100 for retrieving a copy of a document using a machine-recognized portion of a corresponding source document. A source document 102, which may be an imperfect or incomplete document as discussed above, and which may be a visual text or an audible recording is of interest to user 105. At least a portion 104 of source document 102 is provided to a system 101 that includes a machine recognition module 110 and a search engine module 120.

The machine recognition engine 110, which may be implemented in hardware, software, or both, receives an input from the source document 102. The input includes at least a portion 104 of the source document 102 in a format that can be recognized by the machine recognition engine 110. For example, in some embodiments, the format of the portion 104 of the source document is provided as visual images that can be used by an OCR engine 110. In other embodiments, the format of the portion 104 of the source document is provided as audible signals which can be used by an ASR engine 110.

The machine recognition engine 110 recognizes the portion 104 of the source document and provides a machine recognized portion 106 of information that can be displayed to user 105 audibly or visually for confirmation of said recognized portion 106. In addition, the recognized portion 106 information is provided to a search engine 120 and will be used as an input for search engine 120 so that search engine 120 can locate a complete copy of the source document as described earlier.

Specifically, search engine 120 takes the machine recognized portion 106 information and accesses a database 130 or other information over a network 140 in search of documents and information corresponding to source document 102 or the portion 104 of source document 102. Network 140 may comprise the Internet or another wide area or local area network to which search engine 120 may be connected. As mentioned above, the search engine 120 may be implemented in some embodiments remotely from user 105 or an associated user device. For example, the search engine 120 may be implemented in some embodiments on another machine that is connected to system 101 by a network or other connection. In certain specific embodiments, a user device may comprise a wireless communication device such as a cell phone, and the search engine 120 may be connected to the user device by way of a wireless connection and the search engine may be designed into a server computer run by the wireless carrier or another vendor of search engine services.

A complete document 132, which may include an original copy of the source document 102, a version of source document 102, or another document corresponding to source document 102 is found by search engine 120 at least in part on the basis of the machine recognized portion 106 of source document 102. The complete document 132 is not meant to strictly imply that complete document 132 includes everything or all of the information associated with source document 102, but rather, implies that further information user 105 is seeking is found in complete document 132. In many cases, complete document 132 is actually a complete version or an electronic copy of the source document 102.

As one illustrative example, suppose a user wishes to find an electronic and complete copy of the U.S. Constitution. The user 105 may use an OCR scanner to scan the first sentence of the Constitution from a photograph or reproduction of the Constitution or from an encyclopedia, history book, etc. An optically-produced portion 104 comprising the scanned image or photograph of the scanned portion of the source document 102 is obtained. The portion 104 of the source document may be recognizable to a human, but since it is still not machine-recognized a computer has not yet determined this to be any specific content. Therefore, the portion 104 of source document 102 is provided to an OCR machine recognition engine 110, the OCR engine 110 may recognize the optical information in portion 104 of the source document 102 to be English text of the words "We the people . . . " Machine recognition engine 110 will in turn produce a machine-recognized portion 106 of this phrase in an electronic format (e.g., ascii text) that can be input into a search engine 120. Search engine 120 will take the machine recognized portion 106 of "We the people . . . " and connect to a database 130 or go out over network 140 to search for corresponding documents and information corresponding to machine-recognized portion 106. If a suitable match is found, or depending on the settings of the search engine, if multiple results are returned, these can be sorted, processed, and provided back to user 105. In some embodiments user 105 is provided with a copy 108 of the complete document 132 (the U.S. Constitution) corresponding to the original portion 104 of source document 102. The user 105 can now have this copy 108 of complete document 132 for review, or the user may further act on this returned information as needed.

In one interesting embodiment, user 105 may place all or a portion of the returned copy 108 of complete document 132 back into the search engine 120 in order to further refine or locate more relevant information and documents of interest to user 105. It should be understood that user 105 is not necessarily a human user, but may be a computer or a machine or a logical process that controls or requests and receives information using system 101.

Figure 2:
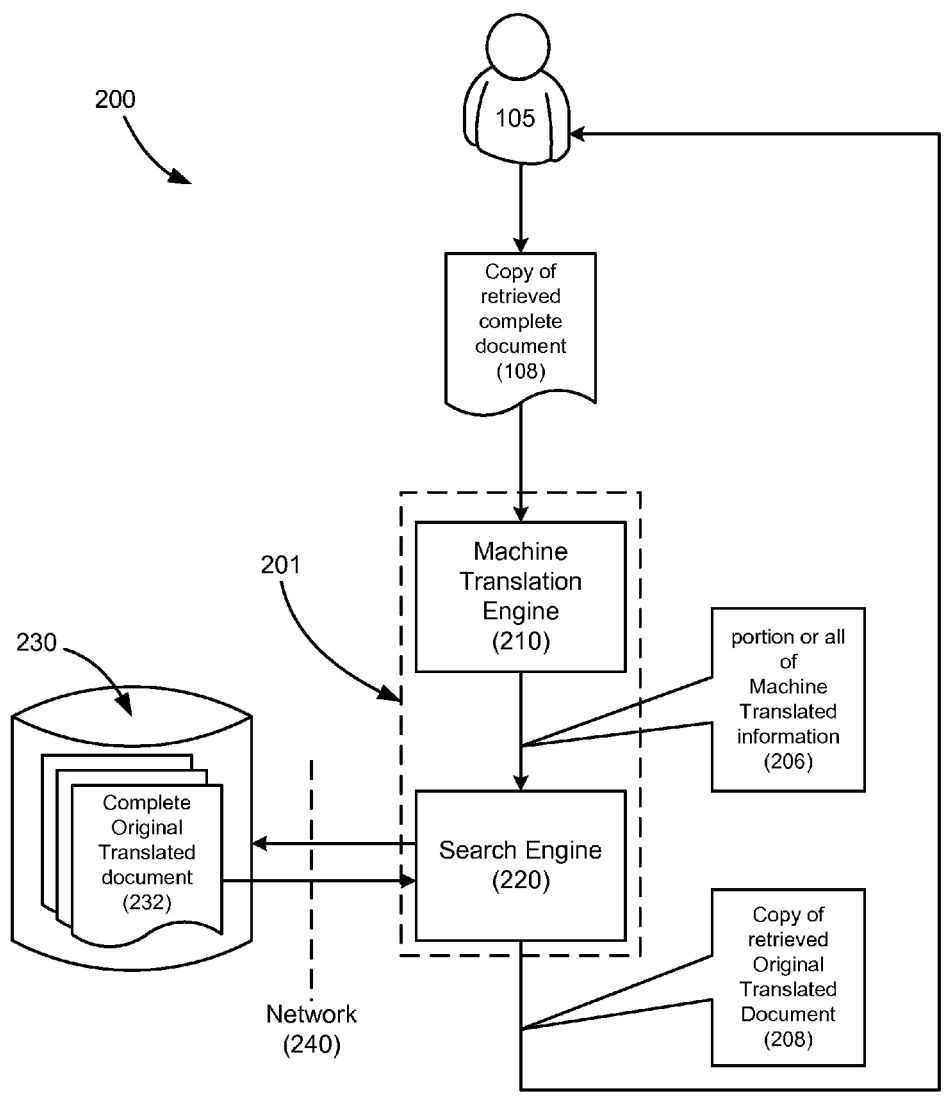
FIG. 2 illustrates an exemplary scenario for locating a translated copy of a source document.

Now referring to FIG. 2, a scenario 200 is shown for the purpose of illustration where user 105 provides a copy of a retrieved complete document (e.g., 108) for input to system 201. As before, system 201 may include a machine translation engine 210 and a search engine 220. In this example, a complete original translated document 232 may be retrieved or found in a storage location or database 230 over a network 240. The system 201 delivers a copy of said retrieved original translated document 208 to user 105.

The order of the present steps may be modified or complemented depending on the specific design or implementation. For example, a machine translation from a first language to a second language may be practiced on the portion of a document so as to obtain a translated equivalent of the portion. Then, the system may conduct a search for the original full document in the second language. That is, the search is conducted on a portion of the document in the second language. In other embodiments, the portion of the document in the first language is not machine translated for the purpose of the search, but rather, then search is conducted in the first language, and once the original full document in the first language is retrieved, a machine translation translates the full original document from the first language to the second language. That is, the search is conducted on a portion of the document in the first language.

Searching for original or related documents can be conducted using several methods and techniques, but notably by using key or select components of the documents. For example, key words or phrases can be used as the driving clues for machine searching as discussed herein using a search engine. These key words or phrases can be used to drive the search for the original documents, or a machine translation can be performed on the key words and phrases and the search engine can operate on the translated key words and phrases. Alternatively, the key words and phrases can be first translated from one language to another using a translation engine, and the searching can be conducted on the translated key words and phrases.

The searching can be driven by or seeded with various information. The seed information used to conduct a search for the original document can include random portions, words, or phrases from the portion of the document of interest. Non-random selection of seed information, such as selection of the longest words, the least common words, or every N-th word from the portion can be used to seed the search for the complete original document corresponding to the portion. Also, permutations of the above searching methods can be used, with various elements being derived randomly, non-randomly, in first language, in a second translated language, or a combination thereof. In other examples, selections from portions near the beginning, end, middle, or combinations thereof can be used to seed or drive the search for the original documents. Select combinations of words and phrases can also be used to enhance the searching effectiveness. Pairs of words or phrases, or triplets or other groupings of elements from the portion documents can be used as clues or seeds for searching as well.

Iterative and sequential multi-step searching can be conducted in some embodiments. For example, a first search can be conducted as described above. Then following said first search, the system can review a set of addresses, URIs, URLs, or locations returned by the first search. The most prevalent or most likely to be useful of these search results can be used to further refine the search process by selecting information from such first round of search results to drive the results of a second round of searching. A measure of search goodness and an indication of the benefits of further iterative searching may be determined. The more likely results or the results with the greater goodness factor or higher frequency of return can be weighted so as to favor these results and drive a subsequent round of searching with the objective of converging on a better or best returned original document. Again, this iterative process can be performed on the original form of the portion in a first language, or a translation can be accomplished to allow the searching techniques to be carried out on a translated second language portion.

Testing the results returned against some known metric is further possible in some or all embodiments.

As to its design and configuration, the machine recognition engine 110 may also be designed into a user device or remote therefrom. For example, the machine recognition engine 110, 210 may be designed in to a server connected to the user device by a wireless network as discussed above. In some embodiments, the user 105 may have a device such as a mobile device or hand held device that can accomplish the initial steps of machine recognition (such as optically scanning a portion 104 of the source document or audibly recording a portion 104 of the source documents 102 signal). The results of this initial machine recognition step may be sent to the machine recognition engine 110, 210 which is remote from user 105 as data files over a network connecting user 105 and the machine recognition engine 110.

System 101, 201 itself may be implemented in a computer apparatus such as a desktop or portable personal computer (PC) or a computer workstation or the like as would be understood by one of ordinary skill in the art upon review of the present description. As mentioned above, system 101 may also be implemented in a mobile or handheld device such as a mobile telephone, gaming device, personal digital assistant (PDA), notebook computer, or the like. System 101 generally includes a processor for processing information and which is capable of receiving input and performing operations on said input according to an algorithm or machine-readable instructions programmably executable on said processor. It should be understood that the organization of the various components of FIG. 1 is not limiting, but that the system 101 may be implemented in other ways where the sub-systems thereof can be designed onto more than one device, using networked devices coupled to one another over a network, or using logic in the "cloud" (using networked components and applications) which is remote from other parts of the system. System 101 may include memory to hold the instructions for carrying out the present methods, and may include other components, hardware, software, or both to accomplish the goals of a specific embodiment.

The present system may also provide other user interface features. For example, the system may provide a means for prompting the user to buy the complete copy of the found document. For example, the user may be prompted to purchase a sound file or an image file based on the results of the search in the database containing image, sound, text or other complete documents corresponding to the recognized portions.

The machine translation engine 210 may translate a portion of the source document and the translated result is used by the search engine 220 for searching database 230. Alternatively, the machine translation engine may translate a result of a found document from a first language to a second language.

In addition, the system may convert one type of document to another type. For example, if the user 105 provides a snippet of a printout of a famous speech in visible/image form to the system, the system may provide not only visible/image results back but may also provide audible or other types of result. Specifically by way of illustration, if a portion of a presidential inaugural address is played to an input microphone of the system, the system may recognize this as the given inaugural address, and then find the complete original audible file of that speech but additionally find and present the user with a printed copy or image of said inaugural address. The user may be allowed in some embodiments to purchase a copy of the audible electronic file or a copy of the readable printed image file of the found result.

In some embodiments, the present method and system may be used to improve the capabilities of automated search, translation, OCR and ASR engines. Specifically, by iteratively providing an output of the search back as an input into the system and repeating the present process it is possible to apply principles of machine learning so as to improve future results of the process. In some instances, the OCR or ASR recognition engines may be modified or made to "learn" from the results of the present process so as to improve the effectiveness, accuracy and performance thereof. In other instances, where the translation from one language to another is performed by a translation engine in a computer, the output of the present process can be used as an iterative input thereto so as to improve the effectiveness and capability of the translation engine. In yet other instances, iterative learning or feedback of the output as an input to the system can be used to improve the effectiveness, accuracy and performance of the search engine and its underlying algorithms. If applied well, the system can converge on a correct search result, which is returned to the user. In addition, the system retains the benefit of the learning achieved by the iterative improvement on its databases, expert systems, look-up-tables, algorithms, and other components of the translation, OCR, ASR, and translation engines. In some aspects the machine translation step, if used, can be considered part of or relevant to the recognition steps and machine recognition engine. Therefore, imperfections in the machine translation engine can be logically related to imperfections in the performance of the machine recognition engine. Feedback of the system's output to the input of the recognition engine can therefore be used to improve the operation of the recognition engine and/or combined recognition and translation components of the system. In other contexts, the translation and search components can be considered logically related and used to improve the operation thereof.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A method for information processing in a processing system, comprising:
   receiving a portion of a first complete document in a first language, said portion including some but not all information in said first complete document;
   searching a database for and retrieving a complete copy of said first complete document in said first language;
   machine translating said first complete document from said first language to a second language thereby generating a machine-translated document in said second language; and
   using the machine-translated document in said second language as a basis for searching for a complete original document in said second language, corresponding to said machine-translated document.

2. The method of claim 1, further comprising optical character recognition (OCR) of said portion of said first complete document and using a product of said OCR to search said database.

3. The method of claim 1, further comprising automatic speech recognition (ASR) of said portion of said first complete document and using a product of said ASR to search said database.

4. The method of claim 1, further comprising retrieving said complete original document in said second language, and using said complete original document to train said processing system and improve a search algorithm programmed therein.

5. The method of claim 1, further comprising retrieving said complete original document in said second language, and using said complete original document to train said processing system and improve a machine translation algorithm programmed therein.

6. The method of claim 1, receiving said portion comprising receiving an incomplete portion of the first complete document.

7. The method of claim 1, receiving said portion comprising receiving an electronic text portion of the first complete document.

8. The method of claim 1, receiving said portion comprising receiving an image representation of a portion of the first complete document.

9. The method of claim 1, receiving said portion comprising receiving an audio representation of a portion of the first complete document.

10. The method of claim 1, further comprising selectively choosing portions of said machine-translated document to perform the search for the complete original document.

11. The method of claim 10, selectively choosing comprising taking selected words from said machine-translated document to perform the search for the complete original document.

12. A computer-based information processing system, comprising:
- a processor for processing information including instructions storable in a memory;
- said memory including machine readable instructions executable in said processor for receiving an incomplete portion of a first document in a first language;
- said memory including machine readable instructions executable in said processor for searching a database for and retrieving a complete copy of said first document in said first language based on said incomplete portion;
- said memory including machine readable instructions executable in said processor for translating said first document from said first language to a second language thereby generating a machine-translated document in said second language; and
- said memory including machine readable instructions executable in said processor for using the machine-translated document in said second language as a basis for searching for a complete original document in said second language, corresponding to said machine-translated document.

13. A computer-implemented search method, comprising:
- performing a first search using an incomplete portion of a document in a first language to locate a corresponding complete document in said first language;
- performing a machine translation of said complete document in said first language to generate a machine-translated document in a second language; and
- performing a second search using said machine-translated document in said second language to locate a corresponding complete original document in said second language.

* * * * *